United States Patent
Wang et al.

(10) Patent No.: US 8,284,267 B2
(45) Date of Patent: Oct. 9, 2012

(54) VIRTUAL CAMERA FOR SHARING A PHYSICAL CAMERA

(75) Inventors: Shaolan Wang, Beijing (CN); Hongning Zeng, Beijing (CN)

(73) Assignee: O2Micro Inc., Santa Clara, CA (US)

( * ) Notice: Subject to any disclaimer, the term of this patent is extended or adjusted under 35 U.S.C. 154(b) by 479 days.

(21) Appl. No.: 12/401,903

(22) Filed: Mar. 11, 2009

(65) Prior Publication Data

US 2010/0231754 A1   Sep. 16, 2010

(51) Int. Cl.
*H04N 5/232* (2006.01)

(52) U.S. Cl. ............. 348/211.5; 348/211.99; 348/211.1; 348/211.2; 348/211.3; 348/211.4; 348/211.6

(58) Field of Classification Search ... 348/211.99–211.6
See application file for complete search history.

(56) References Cited

U.S. PATENT DOCUMENTS

| | | | | |
|---|---|---|---|---|
| 2004/0051793 A1* | 3/2004 | Tecu et al. | ................ | 348/231.99 |
| 2004/0218059 A1* | 11/2004 | Obrador et al. | ............ | 348/220.1 |
| 2006/0050933 A1* | 3/2006 | Adam et al. | .................. | 382/118 |
| 2008/0278582 A1* | 11/2008 | Chung et al. | .................. | 348/159 |

FOREIGN PATENT DOCUMENTS

| | | |
|---|---|---|
| JP | 2004-112809 A | 4/2004 |
| JP | 2005-514834 A | 5/2005 |
| JP | 2008-504606 A | 2/2008 |

\* cited by examiner

*Primary Examiner* — Anthony J Daniels (57) ABSTRACT

A virtual camera component allows multiple camera-use applications to share a camera simultaneously. For example, a first application can request access to the camera for a first set of data, and a second application can also request access to the camera for a second set of data. The virtual camera component is coupled between the first and second applications and the camera, and caches and then processes the data according to respective requirements of the first and second applications.

19 Claims, 6 Drawing Sheets

VIRTUAL CAMERA FOR SHARING A PHYSICAL CAMERA

TECHNICAL FIELD

Embodiments of the present invention allow multiple applications to use a single camera at the same time.

BACKGROUND

Video cameras are widely used in many client applications, such as webcam recording programs, video conference tools and Instant Messenger (IM) tools.

Figure 1:
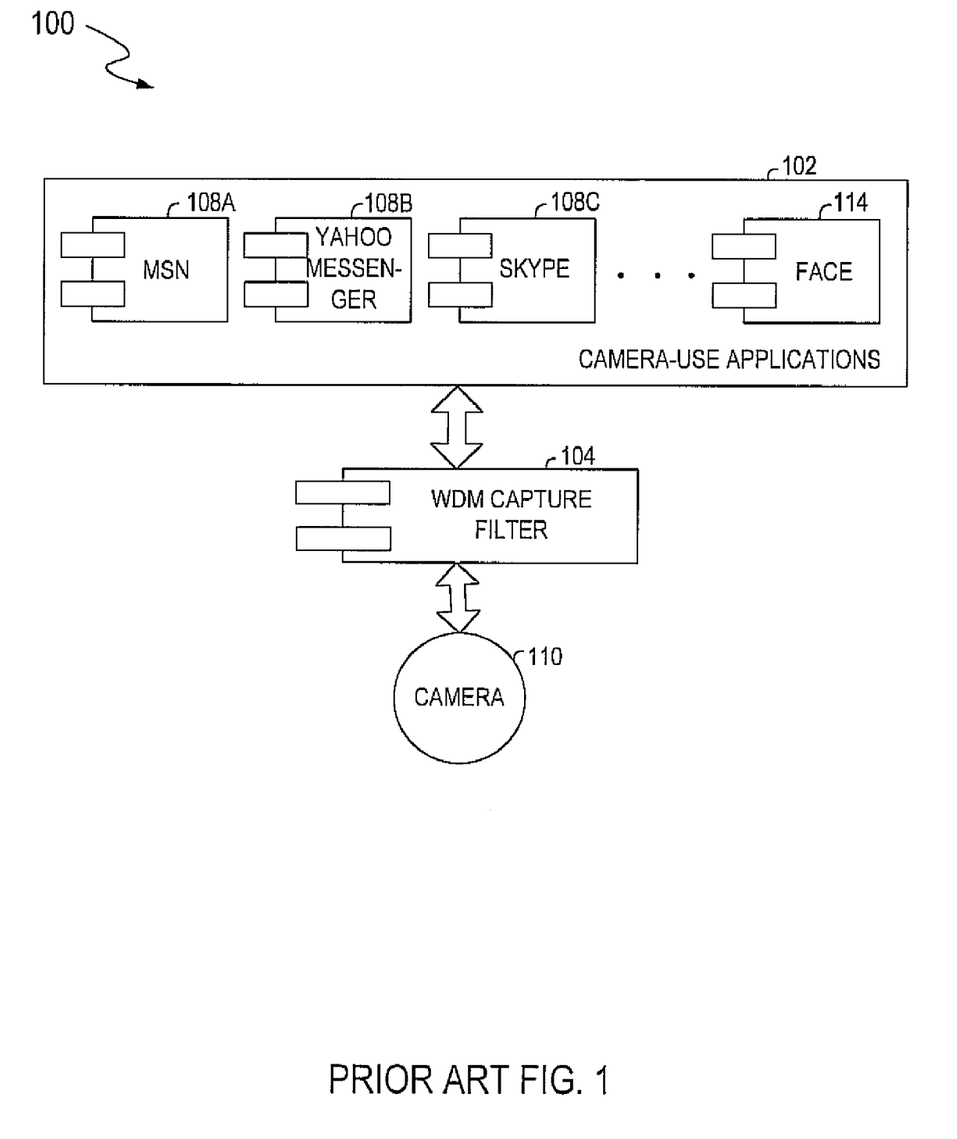
FIG. 1 is a block diagram showing a prior art system installed with multiple camera-use applications.

Referring to PRIOR ART FIG. 1, a system 100 includes a camera-use application block 102, a WINDOWS Driver Model (WDM) capture filter 104, and a physical video camera 110. The block 102 includes multiple camera-use applications, e.g., MSN MESSENGER 108A, YAHOO MESSENGER 108B, SKYPE 108C, and "360 Degree Web FACE" (FACE) application 114. Particularly, the FACE application 114 in the block 102 is an intelligent logging on and locking/unlock application developed by O2Micro Inc.

The WDM capture filter 104 is a standard MICROSOFT DIRECTX component which interacts with a device driver (not shown) of the camera 110. The device driver of the camera 110 may be formed as a driver file with an extension such as ".dll." Once the WDM capture filter 104 links the device driver of the camera 110 to one application, the device driver of the camera 110 will not be available for other applications. In other words, the WDM capture filter 104 only allows one application to use the data captured by the camera 110 at any given time.

For example, once the FACE application 114 requests access to the video camera 110, then the WDM capture filter 104 is called and the device driver of the camera 110 is loaded. After configuration, the camera 110 starts to work and the FACE application 114 can operate normally for facial recognition. When another application, such as the MSN application 108A, attempts to use the camera 110 while the FACE application 114 is using the camera, the camera's device driver is not available to be accessed by the MSN application 108A. There will be a conflict in sharing the camera 110, and the later-calling application MSN application 108A will not be able to use the camera 110.

SUMMARY

In one embodiment, a virtual camera component allows a plurality of camera-use applications to concurrently use the same camera. In one such embodiment, the virtual camera component includes a video capture source filter, a virtual camera center service, and a virtual camera setting tool. The video capture source filter and the virtual camera setting tool are both coupled to the virtual camera center service. The video capture source filter processes video data from the camera and transfers the data to the multiple camera-use applications. The virtual camera center service controls the video capture source filter and transfers the video data from the camera to the video capture source filter. The virtual camera setting tool configures the virtual camera center service with proper working parameters.

Using the virtual camera component, conflicts between multiple camera-use applications are resolved, and multiple applications are able to share a single camera at the same time.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Reference will now be made in detail to the embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "creating," "providing," "capturing," "processing," "calculating," "choosing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In the figures and descriptions thereof, a single block may be described as performing a function or functions; however, in actual practice, the function or functions performed by that block may be performed in a single component or across multiple components, and/or may be performed using hardware, using software, or using a combination of hardware and software.

Figure 2:
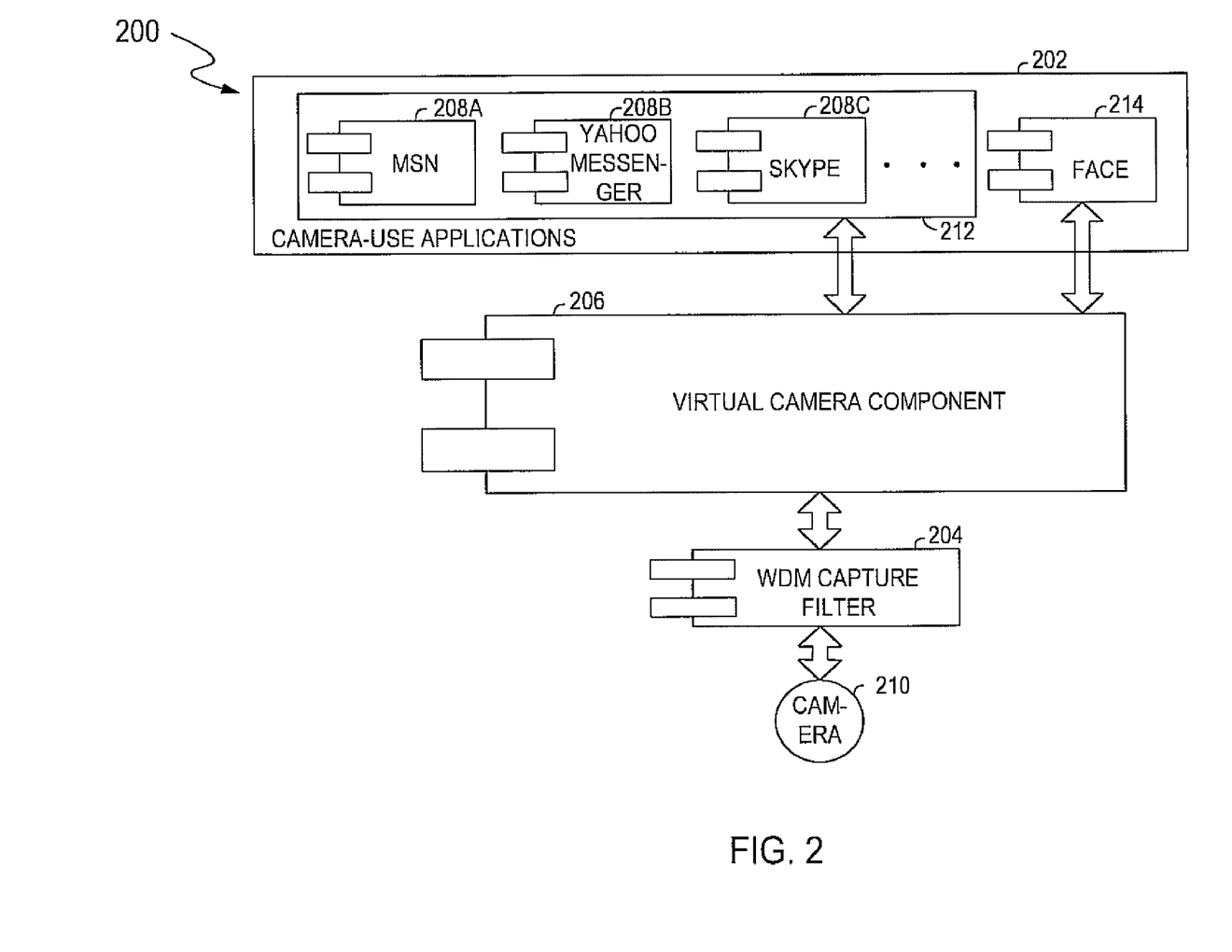
FIG. 2 is a block diagram depicting one embodiment of a system that allows multiple camera-use applications to concurrently share a single camera.

FIG. 2 illustrates one embodiment of a system 200 including a virtual camera component that enables multiple camera-use applications to share a single camera at the same time. The system 200 can be implemented on various computing platforms running various operating systems, such as but not limited to the WINDOWS operating system. For example, the computing platform of the system 200 can be a personal computer, a pocket PC (PPC), a personal digital assistant (PDA), or a smart phone. In one embodiment, components and features of the system 200 are implemented in software.

In the example of FIG. 2, the system 200 includes a camera-use application block 202, a virtual camera component 206, a WDM capture filter 204 and a physical camera 210 (e.g., a video camera). The camera-use application block 202 includes multiple client applications. In one embodiment, the client applications include Instant Messenger (IM) programs supporting real time video chat, such as MSN MESSENGER 208A, YAHOO MESSENGER 208B, SKYPE 208C, AMERICA ONLINE INSTANT MESSENGER (AIM) (not shown), ICQ (not shown), GOOGLE TALK (not shown), PALTALK (not shown), etc. In other embodiments, the client applications in the block 202 may include playback/recording applications such as WINDOWS MEDIA PLAYER (not shown), video conference applications such as NETMEETING (not shown), video editing applications, and other multimedia applications. In one embodiment, the camera-use application block 202 includes a "360 Degree Web FACE" (FACE) application 214, which is an intelligent logon and locking/unlocking application developed by O2Micro Inc. Through facial recognition technology, the FACE application 214 can perform convenient and secure logons and lock/unlock the WINDOWS operating system. A user only needs to verify his/her face through the camera 210 without inputting a username and password.

All the applications in the block 202 may utilize the camera 210 to provide multimedia data. In the present embodiment, only one camera 210 is shown. However, in another embodiment, more than one camera may be coupled to the host computing platform with corresponding camera device drivers. In such an embodiment, users can select one camera from a list of cameras.

The camera 210 opens and remains open in response to an application's call. The camera 210 can support various picture (e.g., *.jpg, *.gif, *.bmp, etc.) and video (e.g., *.wmv, *.avi, *.asf, *.mpeg, *.rm, *.rmvb, etc.) medias.

In the embodiment of FIG. 2, the camera-use application block 202 is coupled to the virtual camera component 206. In one embodiment, the virtual camera component 206 is instantiated using a MICROSOFT software development kit (SDK) component called DIRECTSHOW. The SDK is a programming package including application program interfaces (APIs), programming tools, headers, libraries, sample codes, and documentation. With the help of the DIRECTSHOW SDK, programmers can build sub-programs of the virtual camera component 206 in different high level programming languages.

The virtual camera component 206 can be formed as a component object model (COM)-compliant executable program or process. COM is a software component interface standard introduced by MICROSOFT. Various programming languages that support COM technology (e.g., C++ and JAVA) can be used to create dynamic objects of the virtual camera component 206. Accordingly, reuse of objects with no knowledge of their internal implementation becomes possible, and only well-defined interfaces for the virtual camera component 206 can be provided.

The WINDOWS operating system provides a COM API. The COM API handles loading of the COM executable program, e.g., the virtual camera component 206, and establishes a connection from the camera-use applications in the block 202 to the virtual camera component 206. The virtual camera component 206 can then be plugged into any application in the block 202. Operations performed by the virtual camera component 206 are the same as those of the physical camera 210. As will be described, multiple video capture source filter instances can be established for supporting the multiple camera-use applications in the block 202.

The WINDOWS operating system includes a kernel-mode WINDOWS Driver Module (WDM) capture filter 204 for virtual video. The WDM capture filter 204 is coupled to the virtual camera component 206, and is also linked to a camera device driver file or dynamic link library (DLL or *.dll) file. By creating a link to the DLL file, the WDM capture filter 204 can access the camera 210 to get the captured video data flow. In the present embodiment, the WDM capture filter 204 is provided by MICROSOFT DIRECTSHOW SDK, and is called KsProxy Filter (Ksproxy.ax). A desirable frame rate and resolution mode of the video stream can also be set by the WDM capture filter 204.

Figure 3:
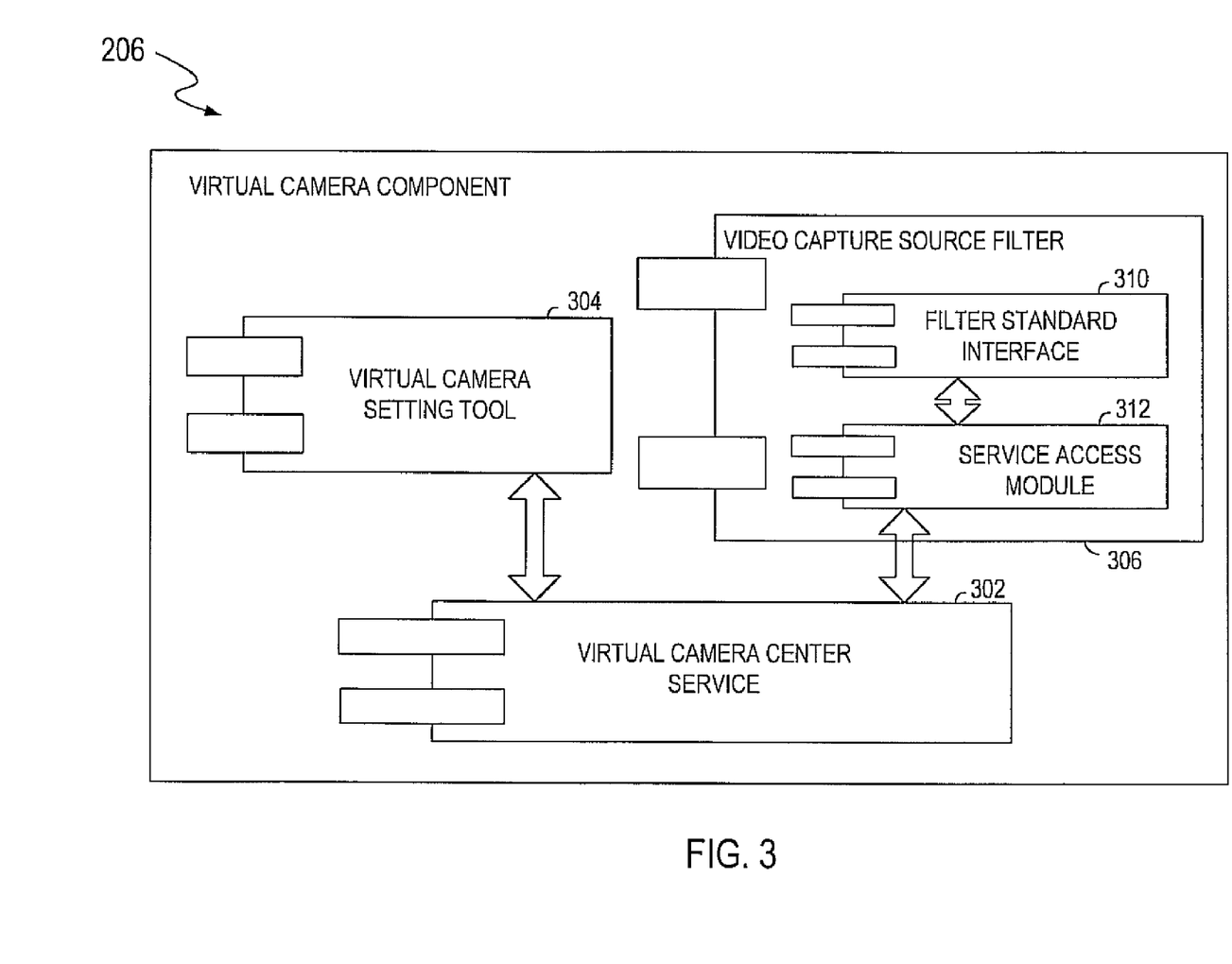
FIG. 3 is a block diagram of a video capture source filter in accordance with one embodiment of the present invention.

FIG. 3 illustrates one embodiment of the virtual camera component 206 in which the virtual camera component 206 includes a video capture source filter 306, a virtual camera center service 302, and a virtual camera setting tool 304.

In one embodiment, the video capture source filter 306 is a standardized DIRECTSHOW modular component and includes source filters, transform filters and renderer filters (not shown). The video capture source filter 306 reads, writes and processes video stream data captured by the camera 210, and then renders the data to the multiple applications of the camera-use application block 202. In one embodiment, the video capture source filter 306 accesses a cache 350 (FIG. 4) for storing video or image data captured by the camera 210. Instead of exclusively using the camera 210 directly, the multiple camera-use applications MSN 208A, YAHOO MESSENGER 208B, FACE 214, etc., can simultaneously read pictures or video stream data from the cache 350. The video capture source filter 306 and other filters are arranged in a filter graph configuration. Each filter may be formed as a functional module.

In the FIG. 3 embodiment, the video capture source filter 306 includes a filter standard interface 310 and a service access module 312. The filter standard interface 310 is a standard interface of the video capture source filter 306. The video capture source filter 306 communicates with the camera-use applications of the block 202 through the filter standard interface 310. The service access module 312 is coupled to the virtual camera center service 302 to read video data from the camera 210 through the virtual camera center service 302.

The virtual camera center service 302 serves as a filter graph manager. It not only assembles filter graph of the video capture source filter 306, but also handles control flow and data flow. The virtual camera center service 302 transfers calling commands to the camera 210, and also provides the camera-captured data to the video capture source filter 306. The virtual camera center service 302 is configured by the virtual camera setting tool 304 before working. The virtual camera setting tool 304 sets parameters of the virtual camera center service 302 as further described in conjunction with FIG. 5 below.

Figure 4:
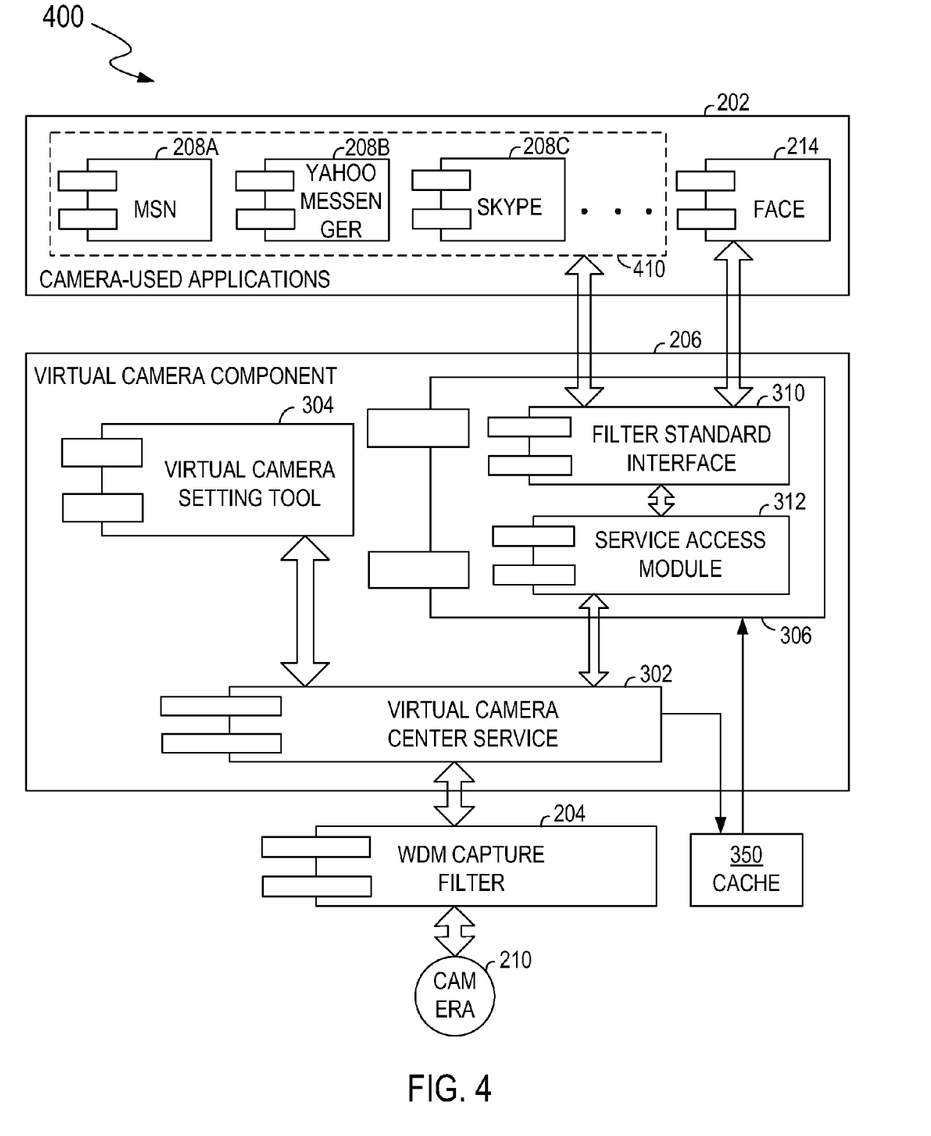
FIG. 4 is a block diagram showing components of a system for sharing a single camera by multiple camera-use applications, in accordance with one embodiment of the present invention.

FIG. 4 is a block diagram of one embodiment of a system 400 in which a virtual camera component 206 is used by multiple camera-use applications of block 202 to share a single camera 210. In FIG. 4, the bidirectional arrowheads between the elements represent logical relationships between the elements. These elements are linked with each other through control flows and data flows.

In the example of FIG. 4, two applications are sharing the camera 210—the FACE application 214 and one application in the block 410 (e.g., the MSN application 208A) are interfaced to the virtual camera component 206 when they are both running (at the same time) and calling the camera 210.

In the present embodiment, the FACE application 214 and MSN application 208A are coupled to the filter standard interface 310 of the video capture source filter 306, and the filter standard interface 310 is coupled to the service access module 312. The video capture source filter 306 is coupled to and controlled by the virtual camera center service 302. Then, with the virtual camera center service 302 coupled to the WDM capture filter 204, the virtual camera component 206 is coupled to the camera 210 through the WDM capture filter 204.

When the FACE application 214 and MSN application 208A call the camera 210, two corresponding video capture source filter instances are created. The two video capture source filter instances may request the same video data format (e.g., resolutions, frame rates, etc.) or two different video data formats. The first video capture source filter instance for the FACE application 214 may initiate a face recognition command, while the other video capture source filter instance for the MSN application 208A may only request video streams. As soon as the two video capture source filter instances are created, the virtual camera component 206 is then configured to work.

In such a scenario, at first, the virtual camera setting tool 304 sets proper parameters (e.g., a resolution) for the virtual camera center service 302. The virtual camera center service 302 may search for the camera 210 and bind the virtual camera component 206 to the camera 210. After analyzing and processing the two calling commands from the two video capture source filter instances, the virtual camera center service 302 transfers the two commands to the camera 210 through the WDM capture filter 204. In response, the camera 210 is driven by the WDM capture filter 204 and starts to capture video stream or image data. If the two applications rely on different image resolutions, for example, then the camera 210 may capture video or image data at the higher resolution. In this example, the captured data is also passed through a face recognition calculation, but only for the first video capture source filter instance (corresponding to the FACE application 214).

The captured video stream or image data is transferred to the virtual camera component 206 through the WDM capture filter 204, and cached in the cache 350. On receiving the data, the virtual camera component 206 processes the data into the formats requested by the two video capture source filter instances—if two different formats were requested, then the data is processed into the requested formats. In particular, it is the virtual camera center service 302 that receives the video stream or image data, and it is the video capture source filter 306 that processes the data. Then, following the two corresponding video capture source filter instances, the processed data are rendered to the FACE application 214 and MSN application 208A, respectively, through the filter standard interface 310.

Figure 5:
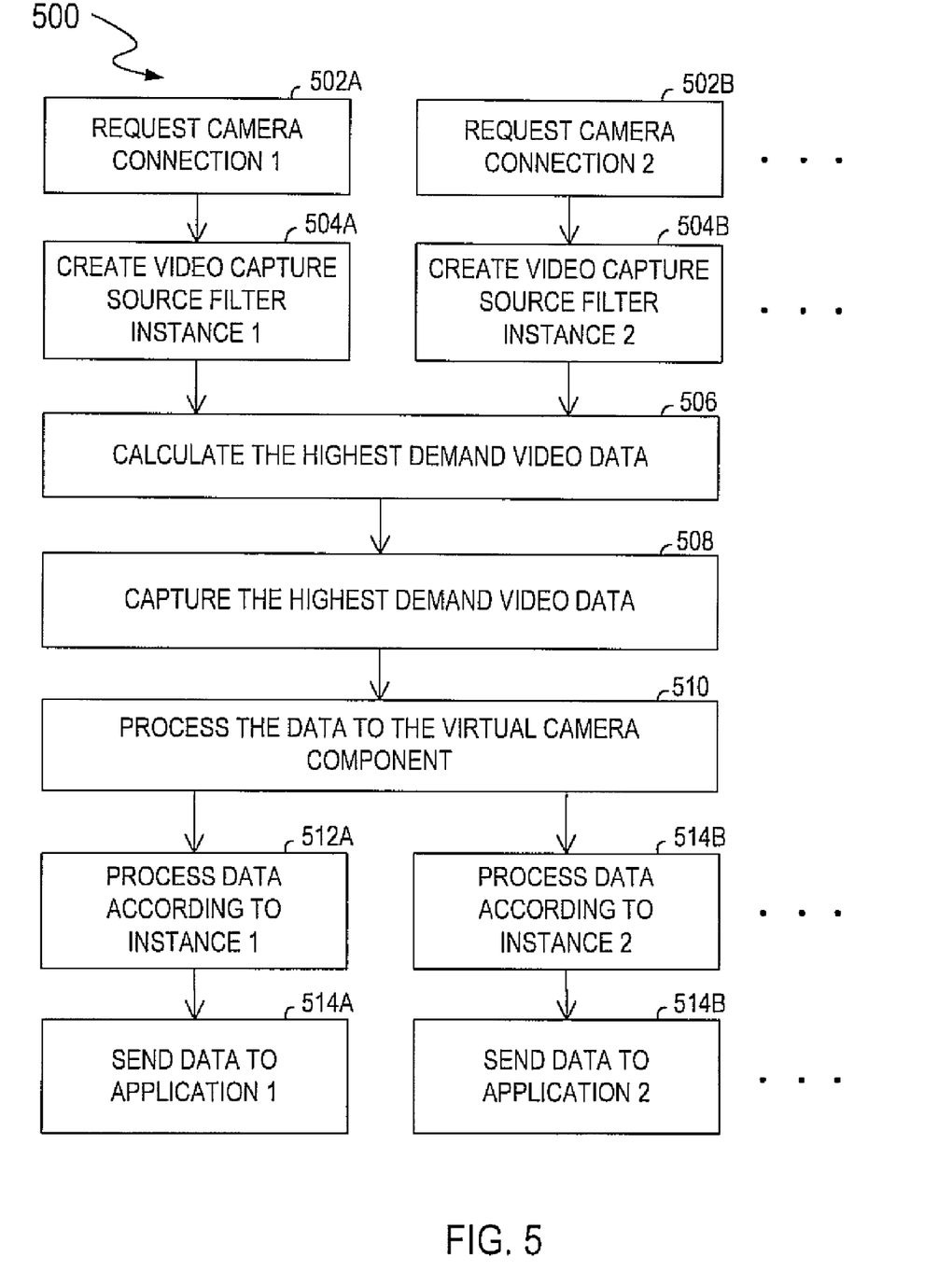
FIG. 5 is a flowchart showing a method for sharing a single camera by multiple camera-use applications in accordance with one embodiment of the present invention.

FIG. 5 is a flowchart of a method 500 for concurrently sharing a single camera by multiple camera-use applications according to one embodiment of the present invention. In one embodiment, the method 500 is implemented as computer-executable instructions stored in a computer-readable medium. In one embodiment, a virtual camera component is developed on the platform of MICROSOFT DIRECTSHOW SDK and is formed as a COM-compliant executable process. The virtual camera component is bound to the physical camera—if there are multiple physical cameras, then the user can select one physical camera from the list and the virtual camera component will be bound to the selected physical camera. In one embodiment, the virtual camera component includes a virtual camera center service, a video capture source filter coupled to the virtual camera center service, and a virtual camera setting tool also coupled to the virtual camera center service. The video capture source filter processes video data captured from the physical camera and transfers it to the multiple camera-use applications. The virtual camera center service controls the video capture source filter and transfers the video data to the video capture source filter. The virtual camera setting tool configures the virtual camera center service with proper working parameters.

The virtual camera component is available to the multiple camera-use applications that are requesting concurrent access to the physical camera. According to the present embodiment, for clarity and brevity, FIG. 5 illustrates the working processes for establishing connections with the virtual camera component for just two camera-use applications. For example, an intelligent logon and locking/unlocking application based on facial recognition (e.g., the FACE application of FIG. 2) and an Internet-based instant messenger application (e.g., the MSN application of FIG. 2) may be calling to access the physical camera at the same time. This discussion can be readily extended to more than two camera-use applications.

At 502A, a first connection to the camera is requested by the FACE application. The FACE application may call to access the camera for facial recognition. Concurrent with the first connection, at 502B, a second connection to the camera is requested by the MSN application. The MSN application may call to access the camera for video stream data transmission. Neither the FACE application nor the MSN application needs to know of the existence of the virtual camera component when they call to access the physical camera at the first time—from the perspective of the camera-use applications, the connection to the virtual camera component is transparent such that the applications appear to be communicating directly with the physical camera. The FACE and MSN applications may send out the two connection requests in sequence or simultaneously. When the two connection commands are concurrently received by the host computer, the virtual camera component is called and loaded.

At 504A and 504B, respectively, a first video capture source filter instance for the FACE application and a second video capture source filter instance for the MSN application are created. The virtual camera component can be triggered in response to the two applications' requests. When using the virtual camera component, video capture source filter instances are created in order to support the two calling applications FACE and MSN. An instance can be both an actual usage and the resulting virtual creation of a copy of an entity loaded into memory. The video capture source filter instance is a copy of the COM API for the virtual camera component. Proper interface parameters of the COM API for the virtual camera component can be set. By creating the first video capture source filter instance, the first connection to the virtual camera component for the FACE application is established. Similarly, by creating the second video capture source filter instance, the second connection to the virtual camera component for the MSN application is established. In one embodiment, a filter name for the virtual camera component can be obtained at 504A and 504B. The filter name is designated by the virtual camera component COM API programmer.

At 506, when the FACE and MSN applications request different formats or different resolutions of video data, the highest demand is transferred to the physical camera—the physical camera operates according to the most critical or most limiting demand of the concurrent requests. For example, a request for a more complicated format of video data or a request for a higher resolution of video data would be considered the highest demand. For example, maybe the first video capture source filter instance for the FACE application sends a face recognition command and requests a series of images with a resolution of 640-by-480 pixels, while the second instance for the MSN application requests a video stream with a resolution of 320-by-240 pixels. After analyzing and processing the two requests, the virtual camera center service of the virtual camera device will then send a command to capture video data at the highest demanded resolution (640-by-480 pixels). The command is sent to the physical camera through the WDM capture filter.

At 508, the camera is driven to capture video data according to the highest demand. In the above example, in response to the received highest command, the WDM capture filter is called and loaded and the camera is driven by the WDM capture filter to capture video data with a resolution of 640-by-480 pixels.

At 510, the captured video data are transferred to the virtual camera component and cached. The WDM capture filter reads the captured data and transfers the data to the virtual camera component. The virtual camera center service of the virtual camera component receives the captured data first.

At 512A, the video data (which still corresponds to that of the highest demand) is processed into data according to the format and resolution requested by the first video capture source filter instance for the FACE application. Also, at 512B, the same video data is processed into data according to the format and resolution requested by the second video capture source filter instance for the MSN application. As mentioned above, the video capture source filter of the virtual camera component processes the video data. In the above example, the received video data with resolution of 640-by-480 pixels are transferred from the virtual camera center service to the video capture source filter. According to the first video capture source filter instance for FACE, the video data are sampled into a series of images with the same resolution of 640-by-480 pixels and then passed to a face recognition algorithm program. Likewise, according to the second video capture source filter instance for MSN, the video data with resolution of 640-by-480 pixels are scaled or cropped down to 320-by-240 pixels.

At 514A, the data with the format and resolution requested by the first video capture source filter instance are rendered to the FACE application. In the above example, the series of images with resolution of 640-by-480 pixels are rendered to the FACE application for facial recognition processing. At 514B, the data requested by the second video capture source filter instance are rendered to the MSN application. In the above example, the video stream data with resolution of 320-by-240 pixels are rendered to the MSN application for instant transmission through the Internet. As such, both the FACE and the MSN applications can use the video data captured by the camera and can work properly.

Figure 6:
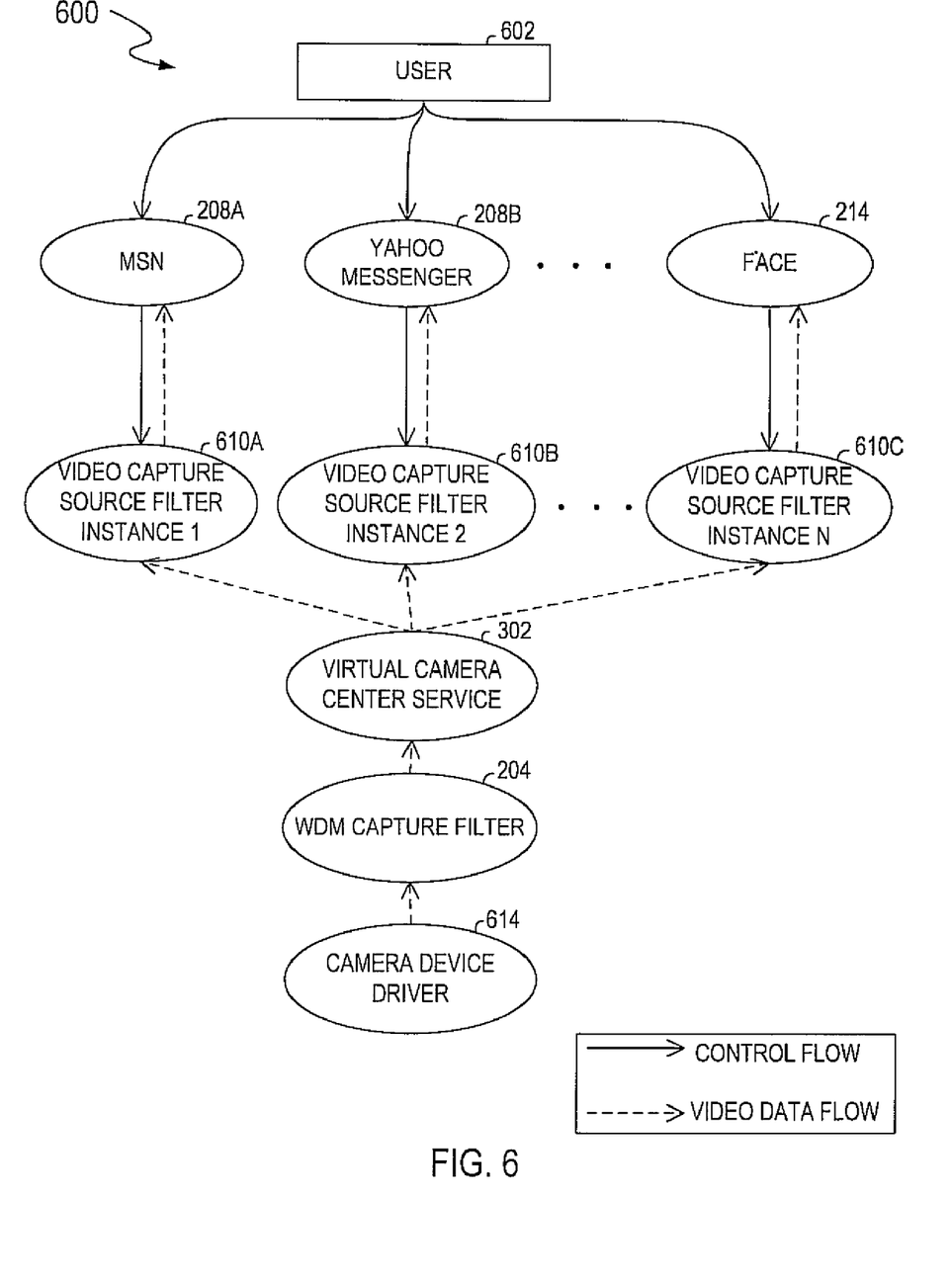
FIG. 6 is a flow diagram showing multiple applications using a single camera in accordance with one embodiment of the present invention.

FIG. 6 is a workflow diagram 600 showing multiple applications using a single physical camera in accordance with one embodiment of the present invention. The workflow diagram 600 is illustrated with respect to a series of control flows and video data flows. Solid lines represent the control flows, while the dashed lines represent the video data flows. In one embodiment, the virtual camera component is formed as a COM-compliant executable process or program.

In an operating system supporting multiple users and multiple tasks such as WINDOWS, a user 602 may open many applications at the same time, and some of the opened applications may need to use the physical camera. In one embodiment, as an example, a first instant messenger application MSN 208A, a second instant messenger application YAHOO MESSENGER 208B, and an intelligent logon and locking/unlocking application based on facial recognition FACE 214 are all in operation and requesting access to the camera. For the purposes of this example, it is assumed that there is only a single physical camera connected to the computer system. FIG. 6 is described in conjunction with FIG. 4.

Once the MSN application 208A calls to access the camera, a first video capture source filter instance 610A is created. Once the YAHOO MESSENGER application 208B calls to access the camera, a second video capture source filter instance 610B is created. Likewise, N video capture source filter instances are created in response to each call to access the camera. The $N^{th}$ video capture source filter instance 610C is created when the FACE application 214 calls to access the camera. The video capture source filter instances 610A, 610B and 610C are virtual interfaces to the physical camera and are instances of the video capture source filter 306.

Next, the virtual camera center service 302 analyzes and manages the N video capture source filter instances 610A, 610B and 610C and transmits a command to the physical camera through the WDM capture filter 204. The virtual camera center service 302 may send the highest demand (e.g., the highest requested resolution) of the video capture source filter instances to the camera. The virtual camera center service 302 also prioritizes the requests from the N instances, and multiplexes conflicting requests.

In response to the command, the camera captures video data at the highest demand. The camera is driven by a camera device driver 614, which is controlled by the WDM capture filter 204. The WDM capture filter 204 reads the captured data and transfers the data to the virtual camera component. The virtual camera center service 302 of the virtual camera component receives and caches the data first.

Then the virtual camera center service 302 caches the video data in the cache 350, where it can be accessed by the video capture source filter 306. In order to satisfy the N video capture source filter instances 610A, 610B and 610C, the video capture source filter asks the video capture source filter 306 to process the video data at the highest demand into data with the respective format and resolution requested by the N instances 610A, 610B and 610C. The N video capture source filter instances 610A, 610B and 610C may request data of the same format and/or resolution or different formats/resolutions.

Finally, as shown in the workflow 600, the data are dispatched to the N camera-use applications following the N video capture source filter instances 610A, 610B and 610C.

In summary, sharing of the camera by the multiple camera-use applications is attained and conflicts between such applications are avoided. The camera-use applications cannot tell whether they are communicating with a physical camera or a virtual camera component—the use of the virtual camera component is transparent to the camera-use applications, and they behave as if they are interfacing directly with the physical camera. Similarly, the user 602 interacts with the virtual camera component as if he/she was interacting with the physical camera. From both the camera-use application perspective and the user's perspective, it seems as if all the applications are using the physical camera.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A computer system comprising:
a camera configured to capture multimedia data;
a memory coupled to said camera, said memory having stored therein computer-executable components comprising:
   a first application that sends a first request for a first access to said camera, wherein said first request comprises a first requirement of said first application;
   a second application that sends a second request for a second access to said camera, wherein said second request comprises a second requirement of said second application, and wherein said first and second accesses overlap in time; and
   a virtual camera component coupled between said first and second applications and said camera, said virtual camera component comprising:
      a virtual camera center service, operable for analyzing and processing said first request and said second request and transferring a command comprising a most limiting requirement of said first and said second requirements to said camera;
      a virtual camera setting tool coupled to said virtual camera center service, and operable for setting a parameter for said virtual camera center service; and
      a video capture source filter coupled to said virtual camera center service, and operable for processing said multimedia data into a first set of data that satisfies said first requirement and also processing said multimedia data into a second set of data that satisfies said second requirement, transferring said first set of data into said first application, and transferring said second set of data into said second application,
   wherein said camera captures said multimedia data according to said command which comprises said most limiting requirement, and wherein said virtual camera component receives said multimedia data that satisfies said most limiting requirement.

2. The computer system of claim 1 wherein said virtual camera center service is coupled to said video capture source filter, and operable for controlling said video capture source filter and for transferring said multimedia data from said camera to said video capture source filter.

3. The computer system of claim 1 wherein said virtual camera setting tool operable for identifying said most limiting requirement.

4. The computer system of claim 1 wherein said capture filter comprises a WINDOWS Driver Module (WDM) capture filter.

5. The computer system of claim 1 wherein said first application is an instant messaging application, and said second application is a facial recognition application.

6. The computer system of claim 1 wherein said first and second applications request different formats and different resolutions of said multimedia data.

7. The computer system of claim 6 wherein said virtual camera component adapts said multimedia data captured by said camera into said different formats and said different resolutions.

8. A computer-readable medium comprising a computer-executable virtual camera component for enabling a plurality of applications to concurrently use a physical camera by sending out a plurality of requests comprising a plurality of requirements of said application, said virtual camera component comprising:

a virtual camera center service operable for analyzing and processing said plurality of requests, transferring a command comprising a most limiting requirement of said requirements to said physical camera, and for receiving video data that satisfies said most limiting requirement from said physical camera;

a video capture source filter controlled by said virtual camera center service, and operable for processing said video data from said physical camera into a plurality of sets of data which satisfy said plurality of requirements, and transferring said plurality of sets of data into said plurality of applications; and a virtual camera setting tool coupled to said virtual camera center service, and operable for setting a parameter for said virtual camera center service, wherein said physical camera captures said video data according to said command which comprises said most limiting requirement.

9. The computer system of claim 1, further comprising:
a cache coupled to said virtual camera component, wherein said virtual camera center service caches said multimedia data in said cache, and wherein said video capture source filter accesses said cache.

10. The computer-readable medium of claim 8 wherein said virtual camera setting tool coupled to said virtual camera center service for identifying said most limiting requirement.

11. The computer-readable medium of claim 8 wherein said video capture source filter comprises a filter instance for each of said applications.

12. The computer-readable medium of claim 8 wherein said capture filter comprises a WINDOWS Driver Module (WDM) capture filter for driving said physical camera.

13. The computer-readable medium of claim 8 wherein said video capture source filter comprises a filter standard interface operable for coupling said plurality of applications to said virtual camera component and for transferring said plurality of sets of data to said plurality of applications.

14. The computer-readable medium of claim 8 wherein said plurality of applications request different formats and different resolutions of said video data.

15. The computer-readable medium of claim 14 wherein said video capture source filter adapts said video data captured by said physical camera into said different formats and said different resolutions.

16. The computer-readable medium of claim 8 wherein said plurality of applications comprise an instant messaging application and a facial recognition application.

17. A method allowing a plurality of applications to simultaneously use a single physical camera via a virtual camera component, wherein said plurality of applications includes a first application and a second application, said method comprising:

creating a first video capture source filter instance in response to a first calling command by said first application in response to a first request from said first application, wherein said first request comprises a first requirement of said first application;

creating a second video capture source filter instance in response to a second calling command by said second application in response to a second request from said second application, wherein said second request comprises a second requirement of said second application, and wherein said first request for said first set of data is concurrent with said request for said second set of data;

setting a parameter for a virtual camera center service in said virtual camera component;

analyzing said first request and said second request by said virtual camera center service;

transferring a command comprising a most limiting requirement of said first and said second requirements to said physical camera by said virtual camera center service, wherein said physical camera captures video data according to said command which comprises said most limiting requirement;

receiving said video data with said most limiting requirement from said physical camera;

processing said video data from said physical camera into a first set of data that satisfies said first requirement and also processing said video data into a second set of data that satisfies said second requirement;

providing said first set of data to said first application; and providing said second set of data to said second application, wherein said second requirement is different from said first requirement.

18. The method of claim 17 further comprising:
caching raw data captured by said physical camera;
processing said raw data into said first set of data according to said first requirement; and
processing said raw data into said second set of data according to said second requirement.

19. The method of claim 17 wherein said raw data corresponds to the highest resolution of data specified according to said first and second requirements.

* * * * *